United States Patent Office 3,057,692
Patented Oct. 9, 1962

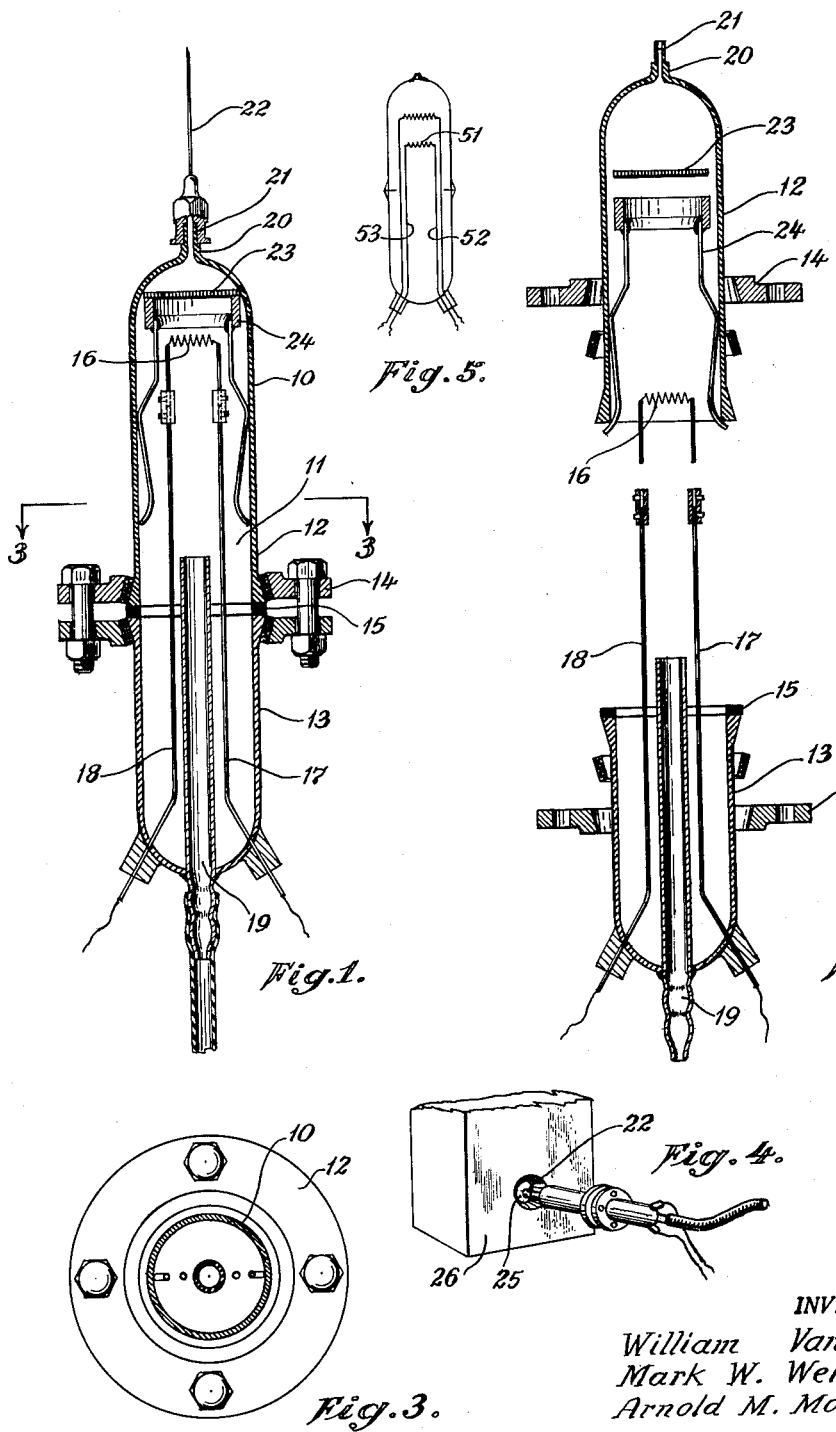

3,057,692
PYROLYTIC INSTRUMENT
William Van Kirk, New Hyde Park, N.Y., and Mark W. Weiss, Ridgewood, and Arnold M. Mowitz, West Englewood, N.J., assignors to Interchemical Corporation, New York, N.Y., a corporation of Ohio
Filed July 17, 1959, Ser. No. 827,905
4 Claims. (Cl. 23—232)

This invention is directed to apparatus for effecting pyrolysis of a material. More particularly, it is directed to apparatus for pyrolyzing a material under controlled conditions and for directly introducing the pyrolyzate formed thereby into a vapor phase chromatographic instrument.

Vapor phase chromatography is a method of separating mixtures of gases or volatile liquids by causing them to traverse a column packed with either a liquid partitioning or solid adsorbing agent, in which repeated distribution occurs between the moving gas phase and the stationary phase. Since the moving phase, being a gas, has a low viscosity, it is quite feasible to use very long columns (often up to 12 ft.); and because diffusion in the moving phase is rapid, high rates of flow may be used without loss of efficiency. It achieves separations which would require many hours by any alternative method, such as fractional distillation. Gas chromatographic columns may be conveniently divided into two types: adsorption columns, in which the stationary phase is a solid such as active charcoal; and partition columns in which the stationary phase is a comparatively non-volatile liquid, such as silicone oil, supported on a porous material such as diatomaceous earth. In both types of column, the moving phase is an inert gas, usually helium or nitrogen, which carries the sample to be analyzed into and through the column in the form of gas or vapor. Connected to the outlet of the column is a device, such as thermal conductivity detector which indicates or records in response to changes in composition of the exit gas. The volume of carrier gas which has to be passed through the column to elute each substance in the chromatogram is referred to as the retention volume of the substance; as in liquid chromatography, this is characteristic of the substance in a given column at a given temperature, and provides a method of identification.

In order that a solid material may be separated and analyzed by a chromatographic instrument, it is often necessary to convert the material to gas or vapor by means of pyrolysis. Existing pyrolytic techniques have been found to have many disadvantages when used in the preparation of a pyrolyzate which is to be introduced into vapor phase chromatographic instruments.

Use of existing pyrolytic techniques to prepare specimens has in many instances resulted in unpyrolyzed materials being introduced into the chromatographic instrument together with the pyrolyzate. This has resulted in erroneous analytical data as well as malfunctioning of the chromatographic instrument. In addition, existing techniques do not allow fully satisfactory means for transferring a pyrolyzate from the pyrolytic apparatus to the chromatographic instrument. In present practice, pyrolysis is conducted separately. This makes it necessary to use cumbersome freezing or absorption apparatus to preserve the more volatile fractions until the pyrolyzate is introduced into the chromatographic instrument.

It is the object of this invention to provide apparatus to be used in cooperation with standard chromatographic instruments, which apparatus will completely and rapidly pyrolyze a given material and immediately introduce the resulting pyrolyzate which is free of contaminants into the chromatographic instrument (thereby eliminating the need for any freezing or absorption apparatus).

This invention accordingly provides pyrolytic apparatus comprising an airtight housing defining a chamber in which an electric heating filament is mounted. The sample to be analyzed is deposited on the filament (as will be hereinafter described). Means are provided to pass an inert carrier gas of the same composition as the inert gas in the chromatographic instrument through the chamber simultaneously with the pyrolysis of the sample by the heated filament. Immediately upon formation of the pyrolyzate, it is swept by the carrier gas from the chamber through suitable coupling means, which in the preferred embodiment comprises a hypodermic needle inserted into the sample injection block of a standard vapor phase chromatographic instrument, into the moving gas phase of the chromatographic instrument. In addition, it is seen that the use of a heated filament permits very accurate temperature control of the material being pyrolyzed. Knowing the applied voltage, the resistance and the dimensions of the filament wire, one may very readily control the temperature of the material thinly coated on said filament. Other objects and advantages will be more fully apparent from a description of the accompanying drawings, in which:

FIG. 1 is a longitudinal section of the pyrolytic apparatus.

FIG. 2 is a longitudinal section of the disassembled pyrolytic apparatus.

FIG. 3 is a cross section of the apparatus along line 3—3 of FIG. 1.

FIG. 4 is a diagram of the instrument being inserted into the injection block of a conventional vapor phase chromatographic instrument.

FIG. 5 is a diagrammatic view of another embodiment of the pyrolytic instrument of this invention.

Referring now to FIGS. 1, 2, and 3, housing 10 which encloses airtight chamber 11 is preferably constructed of metal or Pyrex glass. The upper section 12 of the housing is detachable from the lower section 13 of the housing as shown in FIG. 2, both sections being clamped together in an airtight seal by clamping means 14 and gasket 15 which is held between the adjoining surfaces of upper section 12 and the lower section 13. Gasket 15 is preferably of a material giving an air seal such as rubber or Teflon (a polytetrafluoroethylene polymer manufactured by Dupont, Inc.). The clamping means may be any suitable means for clamping together 2 cylindrical sections. Heating filament 16 which is detachably mounted within chamber 11 may be constructed of any high resistance metal wire; tungsten is used in the preferred embodiment. Conductors 17 and 18 deliver an applied electric current to filament 16. Tube 19 is coupled to a source of inert gas. Projection 20 from the upper end of housing 10 encloses passage 21 which is continuous with chamber 11. Hypodermic needle 22 is mounted on projection 20, the passage within said hypodermic needle being continuous with passage 21. Metal screen 23 mounted on support 24 prevents any particles or other solid material passing out of chamber 11 into hypodermic 22.

The operation of the pyrolytic instrument may be described as follows:

Filament 16 is removed from the housing and coated with a selected quantity of the material to be pyrolyzed. This may be conveniently carried out by dipping the filament into a solution of the material in a volatile solvent and then baking the filament to remove the solvent, thereby leaving the material as a residue. The filament is then replaced and the instrument sealed. An inert carrier gas is then introduced into chamber 11 to purge the instrument of any contaminating gases through passage 21 and hypodermic needle 22. The instrument is then coupled to a conventional vapor phase chromatographic instrument by inserting hypodermic 22 into the injection block of said chromatographic instrument. Referring to FIG. 4, hypodermic 22 is inserted into self sealing opening 25 in injection block 26. Chamber 11 is thereby coupled with the moving gas phase of said chromatographic instrument by means of passage 21 and the passage in hypodermic needle 22. It should here be noted that the composition of the inert gas being introduced into the pyrolytic instrument is the same as that of the inert gas in the chromatographic instrument. Before any current is applied to filament 16, inert gas is driven from tube 19 through the pyrolytic instrument into the chromatographic instrument in a constant stream, the gas being driven from the pyrolytic instrument at a pressure slightly greater than the pressure of the gas in the moving gas phase of the chromatographic instrument. Current is then applied to filament 16, pyrolyzing the material contained thereon. The pyrolyzate formed is then carried into the moving gas phase of the chromatographic instrument by the constant stream of inert gas.

The pyrolytic instrument hereinabove described is preferably used in connection with a gas chromatographic instrument for qualitative analysis. In order to insure accurate results when the pyrolytic instrument is used in connection with a gas chromatographic instrument for quantitative analysis, it is preferred that certain modifications be made in the pyrolytic instrument. Such a modified embodiment of the pyrolytic instrument is shown in FIG. 5. In addition filament 51 is mounted within chamber 11. Conductors 52 and 53 provide filament 51 with a constant current which permits filament 51 to become sufficiently heated to maintain the temperature within chamber 11 at a level above the condensation level of the pyrolyzate. This prevents the condensation of any quantities of pyrolyzate which would affect the results of a quantitative analysis.

It will be understood that it is intended to cover all changes and modifications of the embodiments chosen to illustrate the invention which do not constitute a departure from the spirit and scope of the invention.

What is claimed is:

1. The combination of a pyrolytic apparatus with a vapor phase chromatographic instrument having a moving inert gas phase, said pyrolytic apparatus comprising electrically heated filament means for pyrolyzing a specimen deposited thereon, airtight receptacle means for retaining the pyrolyzate formed and inert gas carrying means for transferring the pyrolyzate into the moving inert gas phase of said chromatographic instrument, the inert gas of said pyrolytic apparatus having the same composition as the inert gas in said chromatographic instrument.

2. The combination of a pyrolytic apparatus with a vapor phase chromatographic instrument having inert gas phase means, said pyrolytic apparatus comprising an airtight housing enclosing a chamber, electric filament heating means mounted within said chamber for pyrolyzing a specimen deposited thereon, pressure means coupled to said housing driving a constant stream of an inert gas having the same composition as the gas in the chromatographic instrument through said chamber, said inert gas carrying the formed pyrolyzate through a fine mesh screen of inert material and from chamber immediately upon the formation thereof and passage means coupling said chamber to the moving inert gas phase means in said chromatographic instrument to permit the passage of the pyrolyzate carrying inert gas therethrough, said pressure means having a pressure greater than the pressure of the moving inert gas phase means of said chromatographic instrument.

3. The combination claimed in claim 2 wherein the pyrolytic apparatus has a section of said housing proximate said filament heating means removable to expose said filament and said filament heating means is detachably mounted and also has means for maintaining the chamber at a temperature high enough to prevent substantial condensation of the pyrolyzate.

4. The method of pyrolyzing a solid material and substantially isolating at least 1 of the non-solid components of the pyrolyzate comprising (1) depositing a suitable amount of the solid material onto a metal filament, which is provided with means for being heated to the temperature required for pyrolysis of the said solid, the filament being enclosed in a chamber within an air-tight housing having pressure means coupled thereto for driving a constant stream of a suitable inert gas through said chamber into a passage connected with a vapor phase chromatographic instrument in such a way that the said stream of inert gas enters the sample space of the chromatographic instrument, the latter being serviced in the usual way by the same kind of inert gas passing through the aforementioned chamber, (2) causing the inert gas to flow through the chamber until unwanted gases and volatile materials have been swept out, (3) heating the filament to the proper temperature for pyrolysis of the sample, the inert gas still being passed through the chamber, (4) conducting the pyrolyzate by means of the flowing inert gas through a fine mesh screen of inert material and then through the passage into the sample space of the vapor phase chromatographic instrument, and (5) operating the said instrument by known methods for substantially isolating at least one component of the pyrolyzate sample.

References Cited in the file of this patent

UNITED STATES PATENTS

| 2,786,350 | Johnson | Mar. 26, 1957 |
| 2,832,675 | Radke et al. | Apr. 29, 1958 |
| 2,905,536 | Emmett et al. | Sept. 22, 1959 |

FOREIGN PATENTS

| 550,425 | Germany | May 11, 1932 |

OTHER REFERENCES

Strassburger et al.: "Analytical Chemistry," vol. 32, No. 4, April 1960, pages 454–457.

Strassburger et al.: "Journal of Dental Research," vol. 37, 86 (1958), abstract of above.